United States Patent
Tao et al.

(10) Patent No.: US 10,256,727 B2
(45) Date of Patent: Apr. 9, 2019

(54) MULTI-PHASE POWER SUPPLY WITH DC-DC CONVERTER INTEGRATED CIRCUITS HAVING CURRENT SHARING FUNCTION

(71) Applicant: Chengdu Monolithic Power Systems Co., Ltd., Chengdu (CN)

(72) Inventors: Wanke Tao, Chengdu (CN); Tianzhu Zhang, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 15/846,142

(22) Filed: Dec. 18, 2017

(65) Prior Publication Data

US 2018/0191251 A1 Jul. 5, 2018

(30) Foreign Application Priority Data

Dec. 30, 2016 (CN) .......................... 2016 1 1254730

(51) Int. Cl.
*H02M 3/158* (2006.01)
*H02M 1/08* (2006.01)
*H02M 1/00* (2006.01)

(52) U.S. Cl.
CPC .......... *H02M 3/1584* (2013.01); *H02M 1/08* (2013.01); *H02M 2001/0025* (2013.01)

(58) Field of Classification Search
CPC . H02M 3/1584; H02M 1/08; H02M 2001/025
See application file for complete search history.

(56) References Cited

U.S. PATENT DOCUMENTS

| | | | | |
|---|---|---|---|---|
| 4,969,079 A | * | 11/1990 | Kiriyama | ............ H02M 7/5395 363/132 |
| 7,479,772 B2 | * | 1/2009 | Zane | ....................... H02J 1/102 323/272 |
| 2007/0210649 A1 | * | 9/2007 | Ozawa | ................... H02M 3/156 307/15 |
| 2010/0141230 A1 | * | 6/2010 | Lukic | .................... H02M 3/157 323/283 |
| 2016/0315538 A1 | * | 10/2016 | Nguyen | .............. H02M 3/1584 |
| 2017/0063239 A1 | * | 3/2017 | Wu | ............................ G06F 1/26 |

* cited by examiner

*Primary Examiner* — Adolf Berhane
*Assistant Examiner* — Bart Iliya
(74) *Attorney, Agent, or Firm* — Perkins Coie LLP

(57) ABSTRACT

An interleaved multi-phase power supply with a plurality of DC-DC converter ICs. Each DC-DC converter IC has a current sharing pin, and the current sharing pins of the plurality of DC-DC converter ICs are connected together. Each DC-DC converter IC receives a feedback voltage signal to compare with a reference voltage signal to generate an error voltage signal as a reference of an output current of the corresponding DC-DC converter IC. And each DC-DC converter IC has a mismatch voltage regulation module regulating the error voltage signal to be equal to an average of error voltage signals of the plurality of DC-DC converter ICs.

18 Claims, 5 Drawing Sheets

MULTI-PHASE POWER SUPPLY WITH DC-DC CONVERTER INTEGRATED CIRCUITS HAVING CURRENT SHARING FUNCTION

CROSS-REFERENCE TO RELATED APPLICATION

This application claims the benefit of CN application No. 201611254730.X, filed on Dec. 30, 2016, and incorporated herein by reference.

TECHNICAL FIELD

The present invention generally refers to integrated circuit (IC), and more particularly but not exclusively refers to DC-DC converter ICs, multi-phase power supplies with DC-DC converter ICs and current sharing methods.

BACKGROUND

In power conversion applications, an interleaved multi-phase power supply is widely used in large power and large current condition since the interleaved multi-phase power supply may be able to provide a large output current with small current ripples, and optimized thermal and power distributions. However, due to biases of the load characteristics and of the control parameters are existed among multiple phase circuits of the interleaved multi-phase power supply, output current biases may thus be generated among multiple output current signals corresponding to the multiple phase circuits. The output current biases may affect efficiency and stability of the system. Therefore, current sharing control is indispensable in the interleaved multi-phase power supply. Generally, the interleaved multi-phase power supply may include a plurality of identical DC-DC converter ICs, and each DC-DC converter IC is used to control the corresponding phase circuit of the interleaved multi-phase power supply. For a prior current sharing control, each DC-DC converter IC may comprise a pin COMP. One DC-DC converter IC is operated as a master IC, and the remained DC-DC converter ICs are operated as slave ICs. The master IC receives a feedback voltage signal representative of an output voltage signal of the interleaved multi-phase power supply, and further compares the feedback voltage signal with a reference voltage signal to generate an error signal which can be drawn out of the master IC through the pin COMP. Each slave IC receives the error signal from its pin COMP. Due to the master IC and the slave ICs adopt the same error signal as a reference value of their output current signals, the current sharing control of the multiple output current signals can be realized.

However, for a DC-DC converter IC having low quiescent current, parasitic capacitor on the pin COMP may affect stability and dynamic response of DC-DC converter IC. Thus, the current sharing control is unable to be realized by adopting the pin COMP.

Therefore, it is desired to have a solution for realizing the current sharing in the interleaved multi-phase power supply with a plurality of the DC-DC converter ICs having low quiescent current.

SUMMARY

Embodiments of the present invention are directed to interleaved multi-phase power supply, comprising: an input terminal, configured to receive an input voltage signal; an output terminal, configured to provide an output voltage signal; N DC-DC converter integrated circuits (ICs), coupled between the input terminal and the output terminal, wherein N is an integer larger than or equal to 2, and wherein each of the N DC-DC converter ICs comprises: an input pin, coupled to the input terminal to receive the input voltage signal; a switching pin, coupled to the output terminal; a feedback pin, configured to receive a feedback voltage signal indicative of the output voltage signal, wherein the feedback voltage signal is configured to generate an error voltage signal indicative of a difference of the feedback voltage signal and a reference voltage signal; a current sharing pin, wherein N current sharing pins of the N DC-DC converter ICs are connected together to generate an average voltage signal on the current sharing pin, and wherein the average voltage signal is indicative of an average of N error voltage signals; a power stage, configured to convert the input voltage signal to a switching voltage signal on the switching pin; and a mismatch voltage regulation module, coupled between the feedback pin and the current sharing pin, and configured to regulate the error voltage signal to be equal to the average of N error voltage signals Embodiments of the present invention are further directed to a DC-DC converter IC used for an interleaved multi-phase power supply, wherein the interleaved multi-phase power supply comprises N DC-DC converter ICs connected in series, comprising: an input pin, configured to receive the input voltage signal; a switching pin, configured to provide a switching voltage, and coupled to an output terminal of the interleaved multi-phase power supply; a feedback pin, configured to receive a feedback voltage signal indicative of an output voltage signal of the interleaved multi-phase power supply, wherein the feedback voltage signal is configured to generate an error voltage signal indicative of a difference of the feedback voltage signal and a reference voltage signal; a current sharing pin, wherein N current sharing pins of the N DC-DC converter ICs are connected together to generate an average voltage signal on the current sharing pin, and wherein the average voltage signal is indicative of an average of N error voltage signals; and a mismatch voltage regulation module, coupled between the feedback pin and the current sharing pin, and configured to regulate the error voltage signal to be equal to the average of N error voltage signals.

Embodiments of the present invention are further directed to a current sharing control method for an interleaved multi-phase power supply having N DC-DC converter IC, wherein the N DC-DC converter ICs are connected in parallel between an input terminal of the interleaved multi-phase power supply and an output terminal of the interleaved multi-phase power supply, and wherein the N DC-DC converter ICs is the same, and wherein each of the N DC-DC converter ICs comprise a current sharing pin, comprising: generating a feedback voltage signal indicative of an output voltage signal of the interleaved multi-phase power supply; generating an error voltage signal indicative of a difference of the feedback voltage signal and a reference voltage signal; generating a mismatch voltage signal, wherein the mismatch voltage signal is proportional to the error voltage signal; connecting current sharing pins of the N DC-DC converter ICs together to generate an average voltage signal on the current sharing pin, wherein the average voltage signal is proportional to an average of N error voltage signals, and wherein a proportional coefficient of the average voltage signal versus the average of N error voltage signals is equal to a proportional coefficient of the mismatch voltage signal versus the error voltage signal; regulating the error voltage signal to be equal to the average of N error voltage signals; and regulating an output current signal of the corresponding DC-DC converter IC based on the error voltage signal.

BRIEF DESCRIPTION OF THE DRAWINGS

Non-limiting and non-exhaustive embodiments are described with reference to the following drawings.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

The phrase "couple" includes direct connection and indirect connection. Indirect connection includes connection through conductor which has resistance and/or parasitic parameters such as inductance and capacitance, or connection through diode, and so on.

Figure 1:
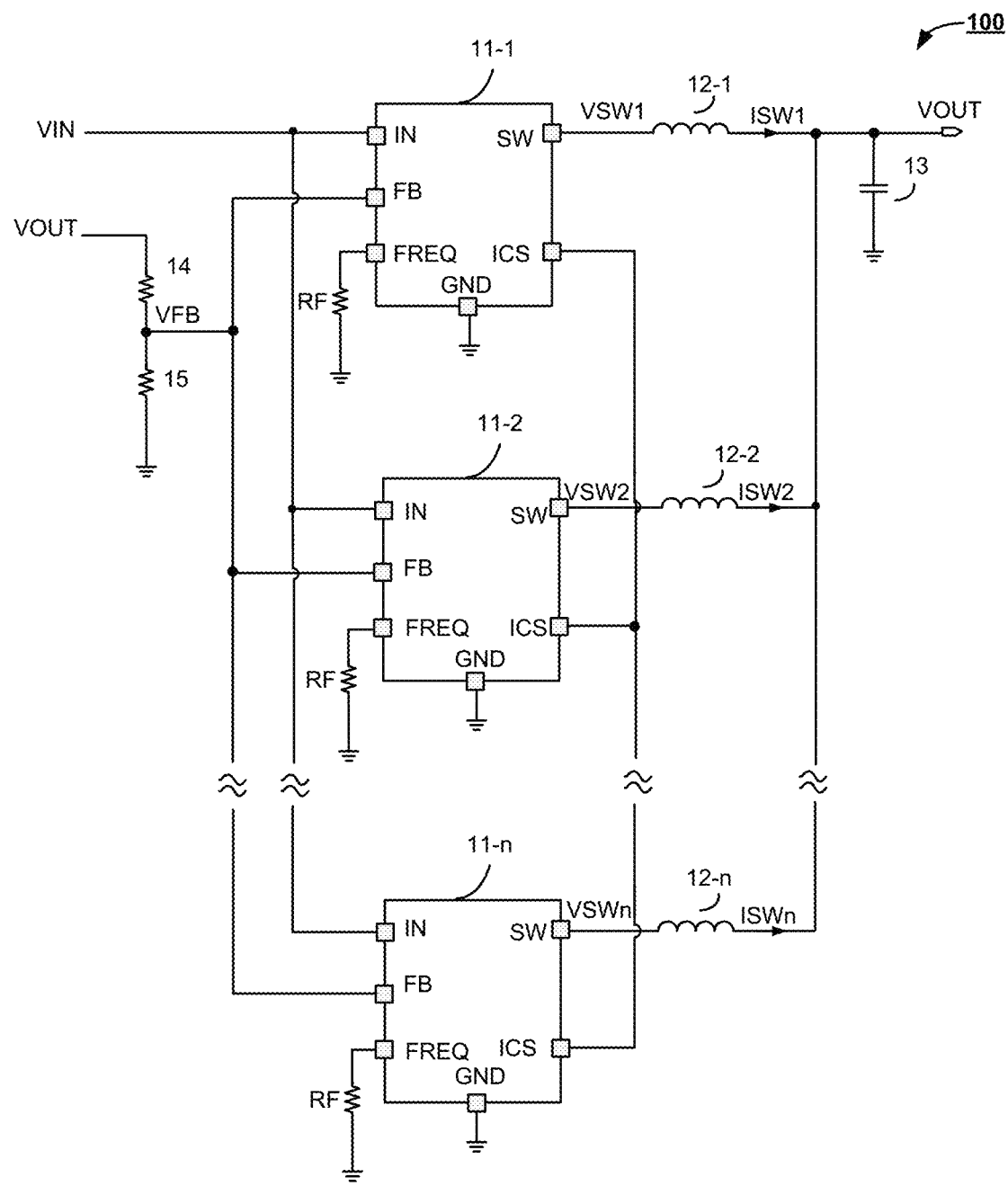
FIG. 1 schematically illustrates an interleaved multi-phase power supply 100 in accordance with an embodiment of the present invention.

FIG. 1 schematically illustrates an interleaved multi-phase power supply 100 in accordance with an embodiment of the present invention. As shown in FIG. 1, the interleaved multi-phase power supply 100 may comprise N DC-DC converter integrated circuits (ICs) (11-1, 11-2, . . . , 11-n), with N corresponding to the number of phases in the interleaved multi-phase power supply 100, and N is an integer larger than or equal to 2. One of ordinary skill in the art could be understood that the value of N can be flexibly chosen in accordance with the load of the interleaved multi-phase power supply 100.

In the exemplary embodiment of FIG. 1, the N DC-DC converter ICs (11-1, 11-2, . . . , 11-n) may have the same schematic structures and functions. In an embodiment, each DC-DC converter IC (11-1, 11-2, . . . , or 11-n) may be implemented as a single-chip, monolithic IC having low quiescent current. In the exemplary embodiment of FIG. 1, each DC-DC converter IC may comprise a plurality of pins, such as an input pin IN, a switching pin SW, a feedback pin FB, a frequency setting pin FREQ, a current sharing pin ICS, and a ground pin GND.

Figure 2:
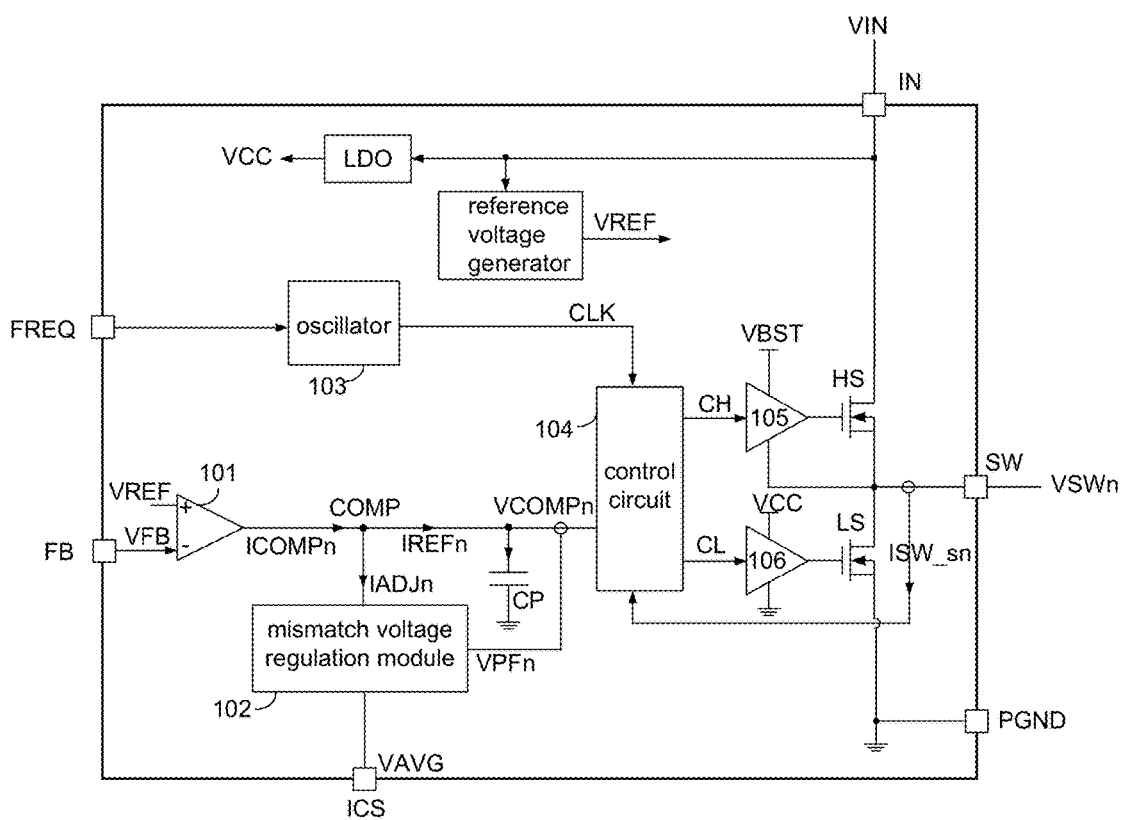
FIG. 2 schematically illustrates the DC-DC converter IC 11-n in accordance with an embodiment of the present invention.

The input pin IN of each DC-DC converter IC may be coupled to an input terminal of the interleaved multi-phase power supply 100 to receive an input voltage signal VIN. The switching pin SW of each DC-DC converter IC may be configured to provide a switching voltage signal, e.g., the switching pin SW of a first DC-DC converter IC 11-1 is configured to provide a first switching voltage signal VSW1, the switching pin SW of a second DC-DC converter IC 11-2 is configured to provide a second switching voltage signal VSW2, and the switching pin SW of the DC-DC converter IC 11-n is configured to provide a switching voltage signal VSWn, and so forth. Each DC-DC converter IC may further comprise a power stage, such as the power stage including a high-side switch HS and a low-side witch LS as illustrated in FIG. 2. Besides, each DC-DC converter IC may further comprise a driving circuit configured to drive the power stage so as to convert the input voltage signal VIN to the switching voltage signal (e.g., VSW1, VSW2, . . . , or VSWn). The feedback pin FB of each DC-DC converter IC may be configured to receive a feedback voltage signal VFB indicative of an output voltage signal VOUT of the interleaved multi-phase power supply 100. In the exemplary embodiment of FIG. 1, the feedback voltage signal VFB may be generated by a voltage divider. In the exemplary embodiment of FIG. 1, the voltage divider is illustrated to have two resistors 14 and 15 connected in series. The frequency setting pin FREQ of each DC-DC converter IC may be connected to a logic ground through a frequency setting resistor RF so as to set an operation frequency of the interleaved multi-phase power supply 100. The current sharing pins ICS of the N DC-DC converter IC (11-1, 11-2, . . . , 11-n) may be coupled together. The ground pin GND of each DC-DC converter IC may be connected to the logic ground.

In the exemplary embodiment of FIG. 1, the interleaved multi-phase power supply 100 may further comprise N output inductors (12-1, 12-2, . . . , 12-n). In an embodiment, each output inductor (12-1, 12-2, . . . , or 12-n) may be integrated in the corresponding DC-DC converter IC. Specifically, each output inductor is configured to couple the power stage of the corresponding DC-DC converter IC to the switching pin SW of the corresponding DC-DC converter IC. In another embodiment, the N output inductors (12-1, 12-2, . . . , 12-n) may be connected in the external of the N DC-DC converter ICs (11-1, 11-2, . . . , 11-n). For instance, in the exemplary embodiment of FIG. 1, each output inductor may be connected between the corresponding switching pin and an output terminal of the interleaved multi-phase power supply 100, e.g., the first output inductor 12-1 is coupled between the switching pin SW of the first DC-DC converter IC 11-1 and the output terminal of the interleaved multi-phase power supply 100, the second output inductor 12-2 is coupled between the switching pin SW of the second DC-DC converter IC 11-2 and the output terminal of the interleaved multi-phase power supply 100, and the output inductor 12-n is coupled between the switching pin SW of the DC-DC converter IC 11-n and the output terminal of the interleaved multi-phase power supply 100. In an embodiment, the N output inductors (12-1, 12-2, . . . , 12-n) have the same inductance. The interleaved multi-phase power supply 100 may further comprise an output capacitor 13 connected between the output terminal of the interleaved multi-phase power supply 100 and the logic ground.

In an embodiment, each of the N DC-DC converter ICs (11-1, 11-2, ..., 11-n) may further comprise a mismatch voltage regulation module (e.g., a mismatch voltage regulation module 102 as illustrated in FIG. 2). The mismatch voltage regulation module of the corresponding DC-DC converter IC may be configured to regulate an output current flowing through the corresponding output inductor so as to realize the current sharing of the interleaved multi-phase power supply 100. For example, the mismatch voltage regulation module of the first DC-DC converter IC 11-1 is configured to regulate a first output current ISW1 flowing through a first output inductor 12-1, the mismatch voltage regulation module of the second DC-DC converter IC 11-2 is configured to regulate a second output current ISW2 flowing through a second output inductor 12-2, and the mismatch voltage regulation module of the DC-DC converter IC 11-n is configured to regulate an output current ISWn flowing through an output inductor 12-n.

FIG. 2 schematically illustrates the DC-DC converter IC 11-n in accordance with an embodiment of the present invention. As shown in FIG. 2, the DC-DC converter IC 11-n may comprise an error amplifying circuit having a first input terminal configured to receive the feedback voltage signal VFB from the feedback pin FB, a second input terminal configured to receive an reference voltage signal VREF, and an output terminal. The error amplifying circuit may be configured to compare the feedback voltage signal VFB with the reference voltage signal VREF to generate an error signal indicative of the difference of the feedback voltage signal VFB and the reference voltage signal VREF at the output terminal of the error amplifying circuit. In an embodiment, the error signal may comprise a voltage signal. In another embodiment, the error signal may comprise a current signal. In the exemplary embodiment of FIG. 2, the error amplifying circuit may comprise a transconductance amplifier 101 having a non-inverting input terminal configured to receive the reference voltage signal VREF, an inverting input terminal configured to receive the feedback voltage signal VFB, and an output terminal. The transconductance amplifier 101 is configured to compare the feedback voltage signal VFB with the reference voltage signal VREF to generate an error current signal ICOMPn at the output terminal of the transconductance amplifier 101.

In the exemplary embodiment of FIG. 2, the DC-DC converter IC 11-n may further comprise the mismatch voltage regulation module 102 coupled between the output terminal of the error amplifying circuit and the current sharing pin ICS. The output terminal of the transconductance amplifier 101 of FIG. 2 is labeled as a node COMP for ease of discussion. The mismatch voltage regulation module 102 may be configured to sense the error voltage signal VCOMPn to generate a mismatch voltage signal VPFn indicative of the error voltage signal VCOMPn. In an embodiment, the mismatch voltage signal VPFn is proportional to the error voltage signal VCOMPn. Furthermore, since the current sharing pins ICS of the N DC-DC converter ICs (11-1, 11-2, ..., 11-n−1) are coupled together, the mismatch voltage regulation module 102 of the DC-DC converter IC 11-n is further configured to receive other N−1 mismatch voltage signals (VPF1, ..., VPFn−1) from the other N−1 DC-DC converter ICs (11-1, ..., 11-n−1). The mismatch voltage regulation module 102 of the DC-DC converter IC 11-n may conduct an average operation to the N mismatch voltage signals (VPF1, ..., VPFn−1, VPFn) to generate an average voltage signal VAVG at the current sharing pin ICS. For example, in a two phases interleaved power supply, there are two DC-DC converter ICs (e.g., the first DC-DC converter IC 11-1, and the second DC-DC converter IC 11-2). The mismatch voltage regulation module 102 of the first DC-DC converter IC 11-1 may generate a first mismatch voltage signal VPF1 and the mismatch voltage regulation module 102 of the second DC-DC converter IC 11-2 may generate a second mismatch voltage signal VPF2. The average voltage signal VAVG at the current sharing pin ICS is equal to the average of the first mismatch voltage signal VPF1 and the second mismatch voltage signal VPF2. The equation is shown as follow:

$$V_{AVG} = \frac{V_{PF1} + V_{PF2}}{2}$$

For another example, in a three phases interleaved power supply, there are three DC-DC converter ICs (e.g., the first DC-DC converter IC 11-1, the second DC-DC converter IC 11-2, and a third DC-DC converter IC 11-3). The mismatch voltage regulation module 102 of the first DC-DC converter IC 11-1 may generate the first mismatch voltage signal VPF1, the mismatch voltage regulation module 102 of the second DC-DC converter IC 11-2 may generate the second mismatch voltage signal VPF2, and the mismatch voltage regulation module 102 of the third DC-DC converter IC 11-3 may generate a third mismatch voltage signal VPF3. The average voltage signal VAVG at the current sharing pins ICS of the first DC-DC converter IC 11-1, the second DC-DC converter IC 11-2 and the third DC-DC converter IC 11-3 is equal to the average of the first mismatch voltage signal VPF1, the second mismatch voltage signal VPF2 and the third mismatch voltage signal VPF3. The equation is shown as follow:

$$V_{AVG} = \frac{V_{PF1} + V_{PF2} + V_{PF3}}{3}$$

The mismatch voltage regulation module 102 of each DC-DC converter IC may be configured to regulate the corresponding mismatch voltage signal to be equal to the average voltage signal VAVG, i.e, regulating the corresponding error voltage signal to be equal to an average of the N error voltage signals (VCOMP1, VCOMP2, ..., VCOMPn). For example, in the two phases interleaved power supply, the mismatch voltage regulation module 102 of the first DC-DC converter IC 11-1 is configured to regulate the first mismatch voltage signal VPF1 to be equal to (VPF1+VPF2)/2, and the mismatch voltage regulation module 102 of the second DC-DC converter IC 11-2 is configured to regulate the second mismatch voltage signal VPF2 to be equal to (VPF1+VPF2)/2. In an embodiment, when the mismatch voltage signal of the corresponding DC-DC converter IC is larger than the average voltage signal VAVG, the mismatch voltage regulation module 102 of the corresponding DC-DC converter IC may be configured to decrease the corresponding mismatch voltage signal by the loop control. In another embodiment, when the mismatch voltage signal of the corresponding DC-DC converter IC is smaller than the average voltage signal VAVG, the mismatch voltage regulation module 102 of the corresponding DC-DC converter IC may be configured to increase the corresponding mismatch voltage signal by the loop control.

In an embodiment, the mismatch voltage regulation module 102 may be configured to generate a regulated signal based on the corresponding mismatch voltage signal VPFn and the average voltage signal VAVG to regulate the value of the error voltage signal VCOMPn. More specifically, as shown in the embodiment of FIG. 2, the regulated signal may comprise a pull-down current signal IADJn. The pull-down current signal IADJn may be configured to regulate the error current signal ICOMPn so as to change the error voltage signal VCOMPn. For example, when the mismatch voltage signal VPFn of the DC-DC converter IC 11-n is larger than the average voltage signal VAVG, the pull-down current signal IADJn is increased resulting in a decrease of a regulated current signal IREFn which is equal to the error current signal ICOMPn minus the pull-down current signal IADJn. The regulated current signal IREFn may flow through a capacitor CP to generate the error voltage signal VCOMPn, Thus, the error voltage signal VCOMPn is decreased in response of the decrease of the regulated current signal IREFn until the mismatch voltage signal VPFn is equal to the average voltage signal VAVG. Inversely, when the mismatch voltage signal VPFn of the DC-DC converter IC 11-n is smaller than the average voltage signal VAVG, the pull-down current signal IADJn is decreased resulting in an increase of the regulated current signal IREFn. Thus, the error voltage signal VCOMPn is increased until the mismatch voltage signal VPFn is equal to the average voltage signal VAVG. Finally, the error voltage signals of the N DC-DC converter ICs (11-1, 11-2, . . . , 11-n) are regulated to be equal to each other.

In the exemplary embodiment of FIG. 2, the error voltage signal VCOMPn may be configured to transmit to a control circuit 104, and further configured to operate as a reference signal of a current sensing signal ISW_sn indicative of the output current signal ISWn of the DC-DC converter IC 11-n. In an embodiment, when the control circuit 104 is configured to have a peak current control, the error voltage signal VCOMPn may be operated as a reference of a peak value of the current sensing signal ISW_sn of the DC-DC converter IC 11-n. In another embodiment, when the control circuit 104 is configured to have an average current control, the error voltage signal VCOMPn may be operated as a reference of an average value of the current sensing signal ISW_sn of the DC-DC converter IC 11-n. Of course, the error voltage signal VCOMPn may also be operated as a reference of other suitable value of the current sensing signal ISW_sn of the DC-DC converter IC 11-n. Since the error voltage signal of each of the N DC-DC converter ICs (11-1, 11-2, . . . , 11-n) is regulated to be the same, the reference value (e.g., the peak current, the average current) of the current sensing signal of each DC-DC converter IC is regulated to be the same. Thus, the N output current signals (ISW1, ISW2, . . . , ISWn) can be regulated to be equal to each other, i.e., the current sharing of the interleaved multi-phase power supply 100 can be realized.

In the exemplary embodiment of FIG. 2, the control circuit 104 may be configured to receive the error voltage signal VCOMPn, the current sensing signal ISW_sn and a clock signal CLK to generate a high side control signal CH and a low side control signal CL.

In the exemplary embodiment of FIG. 2, the DC-DC converter IC 11-n may further comprise the power stage illustrated to have a high-side switch HS, a low-side switch LS, a driver 105 and a driver 106. In the exemplary embodiment of FIG. 2, the high-side switch HS and the low-side switch LS are illustrated as metal oxide semiconductor field effect transistors (MOSFETs) having a drain, a source and a gate. In an embodiment, the drain of the high-side switch HS may be coupled to the input pin IN of the DC-DC converter IC 11-n to receive the input voltage signal VIN, the source of the high-side switch HS and the drain of the low-side switch LS may be coupled together to the switching pin SW of the DC-DC converter IC 11-n, and the source of the low-side switch LS may be connected to the logic ground. In an embodiment, the driver 105 may be configured to receive the high-side control signal CH to generate a high-side driving signal to the gate of the high-side switch HS. And the driver 106 may be configured to receive the low-side control signal CL to generate a low-side driving signal to the gate of the low-side switch LS. The input voltage signal VIN is converted to the switching voltage VSWn by switching the high-side switch HS and the low-side witch LS on and off in a complementary manner.

In the exemplary embodiment of FIG. 2, the DC-DC converter IC 11-n may further comprise an oscillator 103. The oscillator 103 may be coupled to the frequency setting pin FREQ, and further configured to generate the clock signal CLK based on the frequency setting resistor RF connected in the external of the frequency setting pin FREQ. The clock signal CLK is configured to set the operation frequency of the DC-DC converter IC 11-n.

In the exemplary embodiment of FIG. 2, the DC-DC converter IC 11-n may further comprise a low dropout regulator (LDO) configured to generate a supply voltage signal VCC based on the input voltage signal VIN, and a reference voltage generator configured to generate the reference voltage signal VREF based on the input voltage signal VIN.

Figure 3:
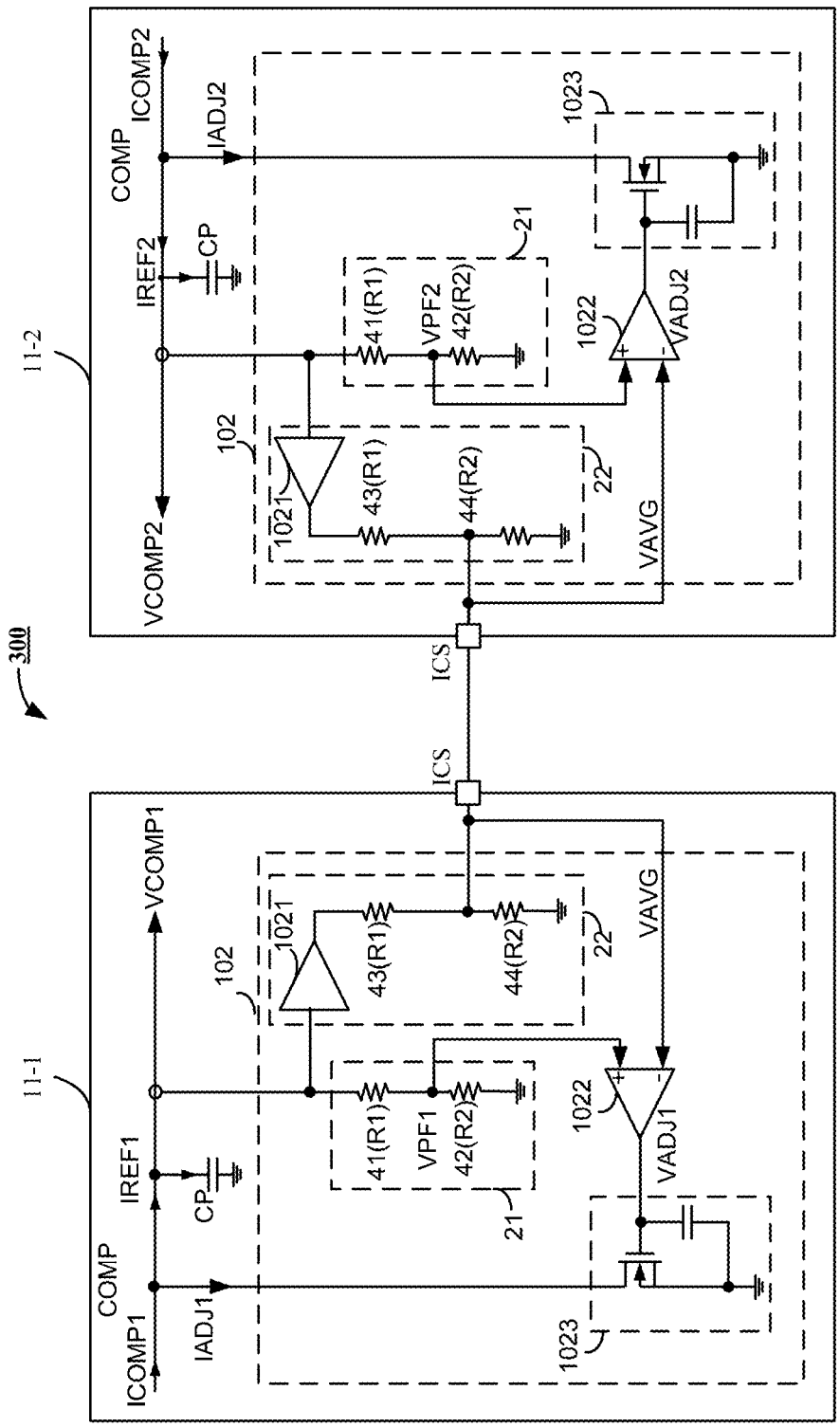
FIG. 3 schematically illustrates the mismatch voltage regulation module 102 of two connected DC-DC converter ICs in accordance with an embodiment of the present invention.

FIG. 3 schematically illustrates the mismatch voltage regulation module 102 of two connected DC-DC converter ICs in accordance with an embodiment of the present invention. As shown in FIG. 3, in order to better understand the operating principle of the mismatch voltage regulation module 102 of the DC-DC converter IC, two DC-DC converter ICs 11-1, 11-2 are illustrated to describe. It should be noted that, in the embodiments of FIG. 3, two connected DC-DC converter ICs 11-1, 11-2 are adopted as an illustrative example of the interleaved multi-phase power supply 100, one of ordinary skill could be understood that any number of DC-DC converter ICs can be chosen in accordance with different loads of the interleaved multi-phase power supply 100. Furthermore, the connection relationship of the DC-DC converter ICs 11-1, 11-2 of FIG. 3 is the same as that of FIG. 1. Since the exemplary embodiment of FIG. 3 mainly focus on the description of the current sharing pin ICS and the mismatch voltage regulation module 102, the other pins, such as the input pin IN, the feedback pin FB, the switching pin SW and the ground pin GND, are not illustrated in FIG. 3. One of ordinary skill could be understood that without the illustrations of the pins omitted in FIG. 3, the DC-DC converter ICs 11-1 and 11-2 is still able to operate normally.

In the exemplary embodiment of FIG. 3, the mismatch voltage regulation module 102 may comprise a first voltage divider 21, a second voltage divider 22, and an operation amplifier 1022.

In the exemplary embodiment of FIG. 3, the first voltage divider 21 of the first DC-DC converter IC 11-1 may be coupled to the node COMP to sense a first error voltage signal VCOMP1 to generate the first mismatch voltage signal VPF1 indicative of the first error voltage signal VCOMP1. In an embodiment, the first mismatch voltage signal VPF1 is proportional to the first error voltage signal VCOMP1. The first voltage divider 21 of the second DC-DC converter IC 11-2 may also be coupled to the node COMP to sense a second error voltage signal VCOMP2 to generate the second mismatch voltage signal VPF2 indicative of the second error voltage signal VCOMP2. In an embodiment, the second mismatch voltage signal VPF2 is proportional to the second error voltage signal VCOMP2.

In an embodiment, the first voltage divider 21 may comprise a resistor 41 with resistance of R1 and a resistor 42 with resistance of R2. The resistor 41 and the resistor 42 are connected in series between the node COMP and the logic ground. The voltage on the common connection of the resistor 41 and the resistor 42 of the first DC-DC converter IC 11-1 is the first mismatch voltage signal VPF1. The voltage on the common connection of the resistor 41 and the resistor 42 of the second DC-DC converter IC 11-2 is the second mismatch voltage signal VPF2.

In the exemplary embodiment of FIG. 3, the second voltage divider 22 of the first DC-DC converter IC 11-1 may be connected between the node COMP and the current sharing pin ICS of the first DC-DC converter IC 11-1, and further configured to receive the first error voltage signal VCOMP1. The second voltage divider 22 of the second DC-DC converter IC 11-2 may be connected between the node COMP and the current sharing pin ICS of the second DC-DC converter IC 11-2, and further configured to receive the second error voltage signal VCOMP2. The average voltage signal VAVG may be generated on the current sharing pin ICS based on the first error voltage signal VCOMP1 and the second error voltage signal VCOMP2, and be indicative of an average of the first error voltage signal VCOMP1 and the second error voltage signal VCOMP2. In an embodiment, the average voltage signal VAVG is proportional to an average of the first error voltage signal VCOMP1 and the second error voltage signal VCOMP2. In an embodiment, a proportional coefficient of the first mismatch voltage signal VPF1 versus the first error voltage signal VCOMP1 is the same as a proportional coefficient of the average voltage signal VAVG versus the average of the first error voltage signal VCOMP1 and the second error voltage signal VCOMP2. And a proportional coefficient of the second mismatch voltage signal VPF2 versus the second error voltage signal VCOMP2 is the same as a proportional coefficient of the average voltage signal VAVG versus the average of the first error voltage signal VCOMP1 and the second error voltage signal VCOMP2.

In an embodiment, the second voltage divider 22 may comprise a buffer 1021, a resistor 43 with resistance of R1 and a resistor 44 with resistance of R2. The buffer 1021, the resistor 43 and the resistor 44 are connected in series between the node COMP and the logic ground. The common connection of the resistor 43 and the resistor 44 of the first DC-DC converter IC 11-1 is coupled to the current sharing pin ICS of the first DC-DC converter IC 11-1. The common connection of the resistor 43 and the resistor 44 of the second DC-DC converter IC 11-2 is coupled to the current sharing pin ICS of the second DC-DC converter IC 11-2. Since the resistance (R1) of the resistor 43 is equal to the resistance (R1) of the resistor 41, and the resistance (R2) of the resistor 44 is equal to the resistance (R2) of the resistor 42, it can be deduced that the average voltage signal VAVG is equal to the average of the first mismatch voltage signal VPF1 and the second mismatch voltage signal VPF2.

In the exemplary embodiment of FIG. 3, the operation amplifier 1022 may have a first input terminal, a second input terminal and an output terminal. The first input terminal of the operation amplifier 1022 of the first DC-DC converter IC 11-1 is configured to receive the first mismatch voltage signal VPF1, the second input terminal of the operation amplifier 1022 of the first DC-DC converter IC 11-1 is configured to receive the average voltage signal VAVG. The operation amplifier 1022 of the first DC-DC converter IC 11-1 is configured to compare the first mismatch voltage signal VPF1 with the average voltage signal VAVG to generate a first adjusting signal VADJ1 indicative of the difference of the first mismatch voltage signal VPF1 and the average voltage signal VAVG. In an embodiment, the first adjusting signal VADJ1 is configured to regulate the first error voltage signal VCOMP1 to be equal to the second error voltage signal VCOMP2. The first input terminal of the operation amplifier 1022 of the second DC-DC converter IC 11-2 is configured to receive the second mismatch voltage signal VPF2, and the second input terminal of the operation amplifier 1022 of the second DC-DC converter IC 11-2 is configured to receive the average voltage signal VAVG. The operation amplifier 1022 of the second DC-DC converter IC 11-2 is configured to compare the second mismatch voltage signal VPF2 with the average voltage signal VAVG to generate a second adjusting signal VADJ2 indicative of the difference of the second mismatch voltage signal VPF1 and the average voltage signal VAVG. In an embodiment, the second adjusting signal VADJ2 is configured to regulate the second error voltage signal VCOMP2 to be equal to the first error voltage signal VCOMP1.

In the exemplary embodiment of FIG. 3, the mismatch voltage regulation modules 102 of the DC-DC converter IC may further comprise a current pull-down circuit 1023. The current pull-down circuit 1023 may be coupled between the node COMP and the output terminal of the operation amplifier 1022. The current pull-down circuit 1023 may comprise a transistor having a first terminal coupled to the node COMP, a second terminal connected to the logic ground, and a control terminal, and a capacitor connected between the control terminal of the transistor and the logic ground.

In an embodiment, the control terminal of the transistor of the current pull-down circuit 1023 of the first DC-DC converter IC 11-1 is configured to receive the first adjusting signal VADJ1. The current pull-down circuit 1023 of the first DC-DC converter IC 11-1 may be configured to generate a first pull-down current signal IADJ1 flowing through the transistor by the controlling of the first adjusting signal VADJ1. For example, when the first mismatch voltage signal VPF1 is larger than the average voltage signal VAVG, the first pull-down current signal IADJ1 is increased resulting in a decrease of a first regulated current signal IREF1. And the decrease of the first regulated current signal IREF1 pulls down the first mismatch voltage signal VPF1 until the first mismatch voltage signal VPF1 is equal to the average voltage signal VAVG.

In an embodiment, the control terminal of the transistor of the current pull-down circuit 1023 of the second DC-DC converter IC 11-2 is configured to receive the second adjusting signal VADJ2. The current pull-down circuit 1023 of the second DC-DC converter IC 11-2 may be configured to generate a second pull-down current signal IADJ2 flowing through the transistor by the controlling of the second adjusting signal VADJ2. For example, when the second mismatch voltage signal VPF2 is larger than the average voltage signal VAVG, the second pull-down current signal IADJ2 is increased resulting in a decrease of a second regulated current signal IREF2. And the decrease of the second regulated current signal IREF2 pulls down the second mismatch voltage signal VPF2 until the second mismatch voltage signal VPF2 is equal to the average voltage signal VAVG.

Figure 4:
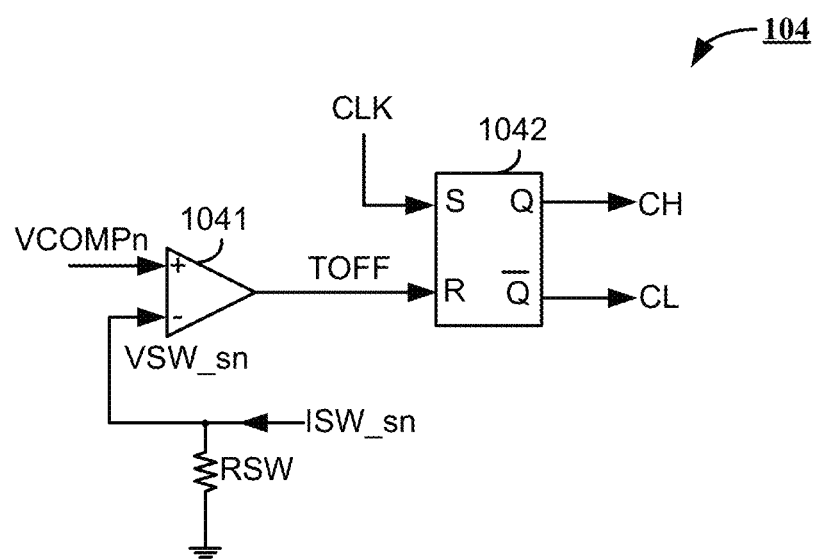
FIG. 4 schematically illustrates the control circuit 104 of the DC-DC converter IC 11-n in accordance with an embodiment of the present invention.

FIG. 4 schematically illustrates the control circuit 104 of the DC-DC converter IC 11-n in accordance with an embodiment of the present invention. As shown in FIG. 4, the control circuit 104 is configured to have a peak current control.

In the exemplary embodiment of FIG. 4, the control circuit 104 may comprise a resistor RSW, a voltage comparator 1041 and a flip-flop 1042. The current sensing signal ISW_Sn may flow through the resistor RSW to generate a sensing voltage signal VSW_sn. The voltage comparator 1041 may have a first input terminal configured to receive the error voltage signal VCOMPn, a second input terminal configured to receive the sensing voltage signal VSW_sn, and an output terminal. The voltage comparator 1041 may be configured to compare the error voltage signal VCOMPn with the sensing voltage signal VSW_sn to generate an off signal TOFF. The off signal TOFF may comprise a logic signal with a logic high state and a logic low state. In an embodiment, when the sensing voltage signal VSW_sn is smaller than the error voltage signal VCOMPn, the off signal TOFF has a logic low state, and when the sensing voltage signal VSW_sn is larger than the error voltage signal VCOMPn, the off signal TOFF has a logic high state.

In the exemplary embodiment of FIG. 4, the flip-flop 1042 may comprise a RS flip-flop having a set terminal S configured to receive the clock signal CLK, a reset terminal R configured to receive the off signal TOFF, a first output terminal and a second output terminal. The RS flip-flop may be configured to conduct a logic operation to the clock signal CLK and the off signal TOFF to generate the high side control signal CH at the first output terminal and the low side control signal CL at the second output terminal respectively.

In the exemplary embodiment of FIG. 4, since each of the N error voltage signals (VCOMP1, VCOMP2, VCOMPn) may be regulated to be equal to an average of the N error voltage signals (VCOMP1, VCOMP2, . . . , or VCOMPn), and the average of the N error voltage signals (VCOMP1, VCOMP2, . . . , or VCOMPn) may be operated as a reference value for the peak value of each of the N output current signals (ISW1, ISW2, . . . , ISWn), the N output current signals (ISW1, ISW2, . . . , ISWn) can be regulated to be equal to each other. Thus, current sharing of the interleaved multi-phase power supply 100 is able to be realized. In the exemplary embodiment of FIG. 4, the peak current control circuit is adopted as an illustrative example, one of ordinal skill in the art can be understood that other control circuits, such as average current control circuit, hysteresis current control circuit can also be adopted.

Figure 5:
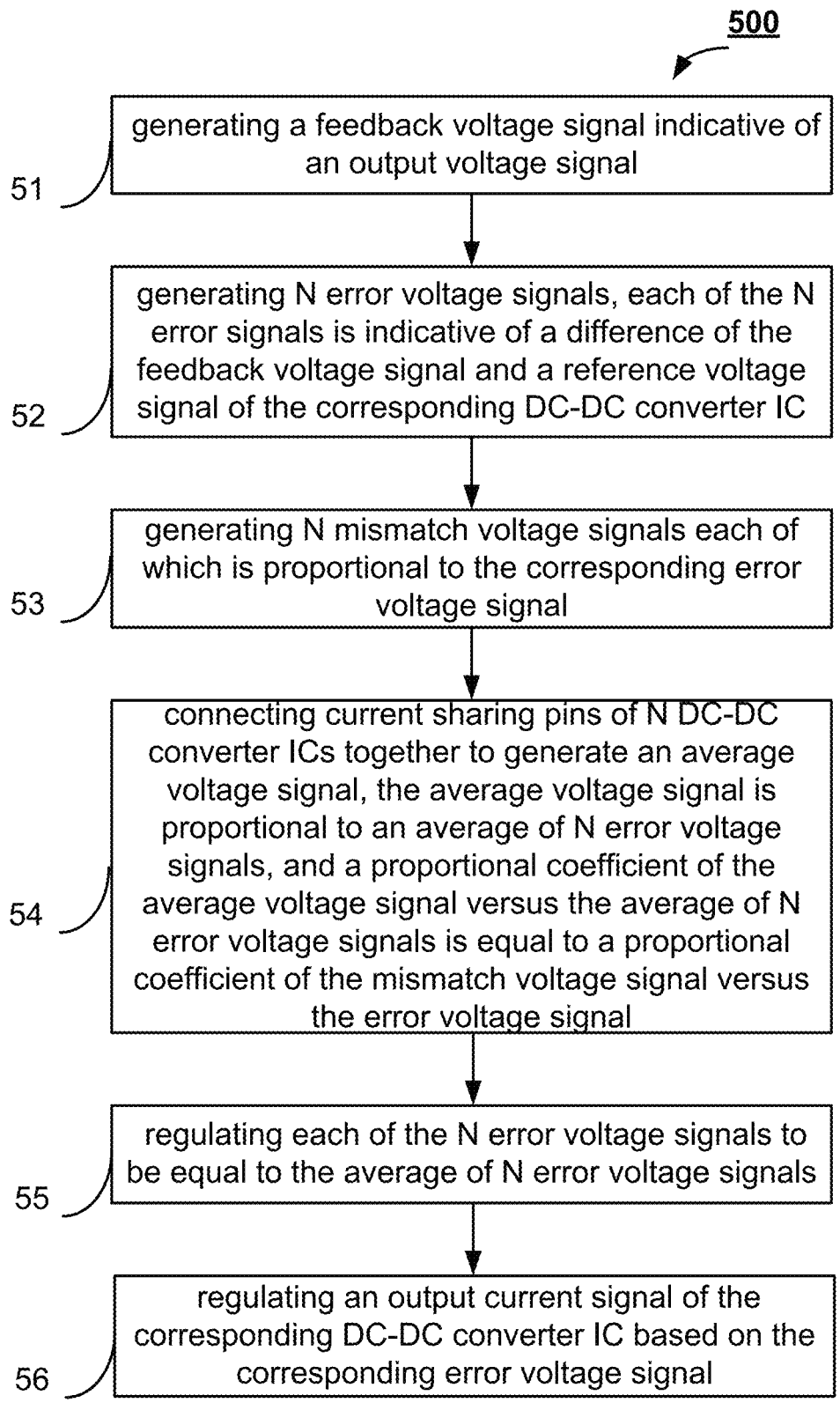
FIG. 5 illustrates a current sharing method 500 for an interleaved multi-phase power supply in accordance with an embodiment of the present invention.

FIG. 5 illustrates a current sharing method 500 for an interleaved multi-phase power supply in accordance with an embodiment of the present invention. The control method 500 can be carried out in the interleaved multi-phase power supply 100 of FIG. 1. As mentioned in FIGS. 1-4, the interleaved multi-phase power supply may comprise N DC-DC converter ICs, and the N DC-DC converter ICs are connected in parallel between an input terminal of the interleaved multi-phase power supply and an output terminal of the interleaved multi-phase power supply. The N DC-DC converter ICs are the same and each DC-DC converter IC comprises a current sharing pin. The current sharing method 500 may comprise steps 51-56.

In step 51, generating a feedback voltage signal indicative of an output voltage signal of the interleaved multi-phase power supply. In an embodiment, the output voltage signal may be converted to the feedback signal by a voltage divider, such as resistors 14 and 15 illustrated in FIG. 1.

In step 52, generating N error voltage signals each of which is indicative of a difference of the feedback voltage signal and a reference voltage signal of the corresponding DC-DC converter IC. In an embodiment, a transconductance amplifier is configured to compare the feedback voltage signal with a reference voltage signal to generate an error current signal. The error current signal flows through a capacitor to generate the error voltage signal.

In step 53, generating N mismatch voltage signals, wherein each of the N mismatch voltage signals is proportional to the corresponding error voltage signal and each of the N mismatch voltage signals and the corresponding error voltage signal has a first proportional coefficient. In an embodiment, the error voltage signal may be converted to the mismatch voltage signal by a first voltage divider, such as the first voltage divide 21 illustrated in FIG. 3.

In step 54, connecting the current sharing pins of the N DC-DC converter ICs together to generate an average voltage signal based on the N mismatch voltage signals, wherein the average voltage signal is proportional to an average of N error voltage signals, and wherein a proportional coefficient of the average voltage signal versus the average of N error voltage signals is the same as a proportional coefficient of the mismatch voltage signal versus the error voltage signal. In an embodiment, the average voltage signal is generated by a second voltage divider, such as the second voltage divide 21 illustrated in FIG. 3.

In step 55, regulating each of the N error voltage signals to be equal to the average of N error voltage signals. In an embodiment, regulating the error voltage signal to be equal to an average of the N error voltage signals mismatch voltage signal may comprise regulating the mismatch voltage signal to be equal to the average voltage signal. More specifically, firstly, the step 55 may comprise comparing the mismatch voltage signal with the average voltage signal to generate a voltage adjusting signal, then, generating a current adjusting signal based on the voltage adjusting signal. When the mismatch voltage signal is larger than the average voltage signal, the current adjusting signal is increased to decrease the error voltage signal, and when the mismatch voltage signal is smaller than the average voltage signal, the current adjusting signal is decreased to increase the error voltage signal.

In step 56, regulating an output current signal of the corresponding DC-DC converter IC based on the corresponding error voltage signal.

Obviously many modifications and variations of the present invention are possible in light of the above teachings. It is therefore to be understood that within the scope of the appended claims the invention may be practiced otherwise than as specifically described. It should be understood, of course, the foregoing invention relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What we claim is:

1. An interleaved multi-phase power supply, comprising:
   an input terminal, configured to receive an input voltage signal;

an output terminal, configured to provide an output voltage signal;

N DC-DC converter integrated circuits (ICs), coupled between the input terminal and the output terminal, wherein N is an integer larger than or equal to 2, and wherein each of the N DC-DC converter ICs comprises:

an input pin, coupled to the input terminal to receive the input voltage signal;

a switching pin, coupled to the output terminal;

a feedback pin, configured to receive a feedback voltage signal indicative of the output voltage signal, wherein an error voltage signal is generated based on the feedback voltage signal, and wherein the error voltage signal is indicative of a difference of the feedback voltage signal and a reference voltage signal;

a current sharing pin, wherein the current sharing pin of the respective N DC-DC converter ICs are connected together to generate an average voltage signal, and wherein the average voltage signal is indicative of an average of the N error voltage signals, and wherein the value of the average voltage signal is proportional to the average of the N error voltage signals;

a power stage, configured to convert the input voltage signal to a switching voltage signal on the switching pin; and a mismatch voltage regulation module, coupled between the feedback pin and the current sharing pin, and configured to regulate the error voltage signal to be equal to the average of the N error voltage signals.

2. The interleaved multi-phase power supply of claim 1, wherein the mismatch voltage regulation module comprises:

a first voltage divider, configured to receive the error voltage signal to generate a mismatch voltage signal, wherein the mismatch voltage signal is proportional to the error voltage signal, and wherein the mismatch voltage signal and the error voltage signal has a first proportional coefficient;

a second voltage divider, coupled between the feedback pin and the current sharing pin, configured to receive the error voltage signal to generate the average voltage signal on the current sharing pin, wherein the value of the average voltage signal and the average of the N error voltage signals has a second proportional coefficient, and wherein the first proportional coefficient is equal to the second proportional coefficient; and an operation amplifier configured to receive the mismatch voltage signal and the average voltage signal, and further configured to compare the mismatch voltage signal with the average voltage signal to generate an adjusting signal configured to regulate the error voltage signal, wherein when the mismatch voltage signal is larger than the average voltage signal, the error voltage signal is decreased by the control of the adjusting signal, and wherein when the mismatch voltage signal is smaller than the average voltage signal, the error voltage signal is increased by the control of the adjusting signal.

3. The interleaved multi-phase power supply of claim 2, wherein each of the N DC-DC converter ICs further comprises:

a transconductance amplifier, configured to receive the feedback voltage signal and the reference voltage signal, and further configured to compare the feedback voltage signal and the reference voltage signal to generate an error current signal; and a capacitor, connected between an output terminal of the transconductance amplifier and the logic ground, the voltage across the capacitor is operated as the error voltage signal.

4. The interleaved multi-phase power supply of claim 3, wherein the first voltage divider comprises:

a first resistor with a first resistance;

a second resistor with a second resistance, wherein the first resistor and the second resistor are connected in series between the output terminal of the transconductance amplifier and the logic ground, and wherein the voltage on the common connection of the first resistor and the second resistor is the mismatch voltage signal.

5. The interleaved multi-phase power supply of claim 4, wherein the second voltage divider comprises:

a buffer;

a third resistor with a first resistance; and a fourth resistor with a second resistance, wherein the buffer, the third resistor and the fourth resistor are connected in series between the output terminal of the transconductance amplifier and the logic ground, and wherein the common connection of the third resistor and the fourth resistor is coupled to the current sharing pin.

6. The interleaved multi-phase power supply of claim 3, wherein the mismatch voltage regulation module further comprises a current pull-down circuit coupled between the output terminal of the transconductance amplifier and the output terminal of the operation amplifier, wherein the current pull-down circuit is configured to receive the adjusting signal to generate a pull-down current signal at the output terminal of the transconductance amplifier.

7. The interleaved multi-phase power supply of claim 1, wherein each of the N DC-DC converter ICs further comprises an error amplifying circuit, wherein the error amplifying circuit is configured to receive the feedback voltage signal and a reference voltage signal, and further configured to compare the feedback voltage signal and the reference voltage signal to generate the error voltage signal.

8. The interleaved multi-phase power supply of claim 1, wherein the interleaved multi-phase power supply further comprises N output inductors, wherein each of the N output inductors is coupled between the corresponding switching pin of the corresponding DC-DC converter IC and the output terminal of the interleaved multi-phase power supply.

9. The interleaved multi-phase power supply of claim 1, wherein the error voltage signal is configured to control the peak current value of an output current of the corresponding DC-DC converter IC.

10. The interleaved multi-phase power supply of claim 1, wherein the error voltage signal is configured to control the average current value of an output current of the corresponding DC-DC converter IC.

11. A DC-DC converter integrated circuits (IC) for an interleaved multi-phase power supply, wherein the interleaved multi-phase power supply comprises N DC-DC converter ICs connected in parallel, comprising:

an input pin, configured to receive the input voltage signal;

a switching pin, configured to provide a switching voltage, and coupled to an output terminal of the interleaved multi-phase power supply;

a feedback pin, configured to receive a feedback voltage signal indicative of an output voltage signal of the interleaved multi-phase power supply, wherein the feedback voltage signal is configured to generate an error voltage signal indicative of a difference of the feedback voltage signal and a reference voltage signal;

a current sharing pin, wherein N current sharing pins of the N DC-DC converter ICs are connected together to generate an average voltage signal on the current sharing pin, and wherein the average voltage signal is indicative of an average of N error voltage signals; and a mismatch voltage regulation module, coupled between the feedback pin and the current sharing pin, and configured to regulate the error voltage signal to be equal to the average of N error voltage signals.

12. The DC-DC converter IC of claim 11, wherein the mismatch voltage regulation module comprises:

a first voltage divider, configured to receive the error voltage signal to generate a mismatch voltage signal, wherein the mismatch voltage signal is proportional to the error voltage signal;

a second voltage divider, coupled between the feedback pin and the current sharing pin, configured to receive the error voltage signal to generate the average voltage signal on the current sharing pin, wherein the average voltage signal is proportional to the average of N error voltage signals, and wherein a proportional coefficient of the average voltage signal versus the average of N error voltage signals is equal to a proportional coefficient of the mismatch voltage signal versus the error voltage signal; and an operation amplifier configured to receive the mismatch voltage signal and the average voltage signal, and further configured to compare the mismatch voltage signal with the average voltage signal to generate an adjusting signal configured to regulate the error voltage signal, wherein when the mismatch voltage signal is larger than the average voltage signal, the error voltage signal is decreased by the control of the adjusting signal, and wherein when the mismatch voltage signal is smaller than the average voltage signal, the error voltage signal is increased by the control of the adjusting signal.

13. The DC-DC converter IC of claim 12, wherein the DC-DC converter IC further comprises:

a transconductance amplifier, configured to receive the feedback voltage signal and the reference voltage signal, and further configured to compare the feedback voltage signal and the reference voltage signal to generate an error current signal; and a capacitor, connected between an output terminal of the transconductance amplifier and the logic ground, the voltage across the capacitor is operated as the error voltage signal.

14. The DC-DC converter IC of claim 13, wherein the mismatch voltage regulation module further comprises:

a current pull-down circuit, coupled between the output terminal of the transconductance amplifier and the output terminal of the operation amplifier, configured to receive the adjusting signal to generate a pull-down current signal at the output terminal of the transconductance amplifier.

15. The DC-DC converter IC of claim 11, wherein the DC-DC converter IC further comprises an output inductor coupled between a power stage of the DC-DC converter IC and the switching pin.

16. The DC-DC converter IC of claim 11, wherein the error voltage signal is configured to regulate an output current signal of the DC-DC converter IC.

17. A current sharing control method for an interleaved multi-phase power supply having N DC-DC converter integrated circuits (ICs), wherein the N DC-DC converter ICs are connected in parallel between an input terminal of the interleaved multi-phase power supply and an output terminal of the interleaved multi-phase power supply, and wherein each of the N DC-DC converter ICs comprises a current sharing pin, comprising:

generating a feedback voltage signal indicative of an output voltage signal of the interleaved multi-phase power supply;

generating N error voltage signals, wherein each of the N error signals is indicative of a difference of the feedback voltage signal and a reference voltage signal of the corresponding DC-DC converter IC;

generating N mismatch voltage signals, wherein each of the N mismatch voltage signals is proportional to the corresponding error voltage signal, and wherein each of the N mismatch voltage signals and the corresponding error voltage signal has a first proportional coefficient;

connecting current sharing pins of the N DC-DC converter ICs together to generate an average voltage signal based on the N mismatch voltage signals, wherein the value of the average voltage signal is proportional to an average of the N error voltage signals, and wherein the value of the average voltage signal and the average of the N error voltage signals has a second proportional coefficient, and wherein the first proportional coefficient is equal to the second proportional coefficient;

regulating each of the N error voltage signals to be equal to the average of N error voltage signals; and regulating an output current signal of the corresponding DC-DC converter IC based on the corresponding error voltage signal.

18. The current sharing control method of claim 17, wherein the step of regulating each of the N error voltage signals to be equal to the average of the N error voltage signals comprises:

comparing the corresponding mismatch voltage signal with the average voltage signal to generate a voltage adjusting signal; and generating a current adjusting signal based on the voltage adjusting signal, wherein when the corresponding mismatch voltage signal is larger than the average voltage signal, the current adjusting signal is increased to decrease the corresponding error voltage signal, and wherein when the corresponding mismatch voltage signal is smaller than the average voltage signal, the current adjusting signa l is decreased to increase the corresponding error voltage signal.

* * * * *